United States Patent
Young

(10) Patent No.: US 9,215,617 B2
(45) Date of Patent: Dec. 15, 2015

(54) DC OFFSET COMPENSATION

(75) Inventor: Robert Young, Cambridge (GB)

(73) Assignee: Neul Ltd., Cambridge (GB)

( * ) Notice: Subject to any disclaimer, the term of this patent is extended or adjusted under 35 U.S.C. 154(b) by 0 days.

(21) Appl. No.: 14/126,068

(22) PCT Filed: Jun. 13, 2012

(86) PCT No.: PCT/EP2012/061172
§ 371 (c)(1),
(2), (4) Date: Apr. 22, 2014

(87) PCT Pub. No.: WO2012/171944
PCT Pub. Date: Dec. 20, 2012

(65) Prior Publication Data
US 2014/0307834 A1 Oct. 16, 2014

(30) Foreign Application Priority Data

| Jun. 13, 2011 | (GB) | 1109829.0 |
| Jun. 13, 2011 | (GB) | 1109830.8 |
| Jun. 13, 2011 | (GB) | 1109836.5 |
| Jun. 13, 2011 | (GB) | 1109837.3 |
| Jun. 13, 2011 | (GB) | 1109840.7 |
| Jun. 13, 2011 | (GB) | 1109844.9 |
| Jun. 13, 2011 | (GB) | 1109848.0 |
| Jun. 13, 2011 | (GB) | 1109850.6 |
| Jun. 13, 2011 | (GB) | 1109853.0 |
| Jun. 13, 2011 | (GB) | 1109854.8 |
| Jun. 13, 2011 | (GB) | 1109863.9 |
| Jun. 13, 2011 | (GB) | 1109867.0 |
| Jun. 13, 2011 | (GB) | 1109874.6 |
| Sep. 30, 2011 | (GB) | 1116910.9 |
| Dec. 23, 2011 | (GB) | 1122238.7 |

(51) Int. Cl.
*H04B 1/38* (2015.01)
*H04L 5/16* (2006.01)
(Continued)

(52) U.S. Cl.
CPC ............. *H04W 28/065* (2013.01); *H04B 1/713* (2013.01); *H04L 5/0032* (2013.01); *H04L 7/041* (2013.01); *H04L 25/061* (2013.01); *H04L 67/28* (2013.01); *H04L 69/18* (2013.01); *H04W 4/005* (2013.01);
(Continued)

(58) Field of Classification Search
CPC .................................... H04W 28/065
USPC ......................................... 375/219
See application file for complete search history.

(56) References Cited

U.S. PATENT DOCUMENTS

| 5,757,858 A | 5/1998 | Black et al. |
| 2004/0264432 A1 | 12/2004 | Hori et al. |

(Continued)

FOREIGN PATENT DOCUMENTS

| EP | 1332592 B1 | 2/2006 |
| EP | 2274834 | 11/2009 |

(Continued)

*Primary Examiner* — Erin File
(74) *Attorney, Agent, or Firm* — Slater & Matsil, L.L.P.

(57) ABSTRACT

A method for estimating an unwanted component that a receiver introduces into a signal at a known frequency, the method comprising applying a frequency offset to a signal, which comprises a wanted component at the known frequency, to form an offset signal having a frequency spectrum in which the wanted component is not positioned at the known frequency, processing the offset signal in the receiver and estimating a component positioned at the known frequency in the frequency spectrum of the processed signal.

17 Claims, 3 Drawing Sheets

(51) Int. Cl.
| | |
|---|---|
| H04W 28/06 | (2009.01) |
| H04L 7/04 | (2006.01) |
| H04L 25/06 | (2006.01) |
| H04W 4/00 | (2009.01) |
| H04W 64/00 | (2009.01) |
| H04W 72/12 | (2009.01) |
| H04B 1/713 | (2011.01) |
| H04W 36/22 | (2009.01) |
| H04L 5/00 | (2006.01) |
| H04W 8/18 | (2009.01) |
| H04W 56/00 | (2009.01) |
| H04W 36/00 | (2009.01) |
| H04W 72/04 | (2009.01) |
| H04W 24/02 | (2009.01) |
| H04L 29/08 | (2006.01) |
| H04L 29/06 | (2006.01) |
| H04B 7/26 | (2006.01) |
| H04W 16/14 | (2009.01) |
| H04W 88/10 | (2009.01) |
| H04W 12/06 | (2009.01) |

(52) U.S. Cl.
CPC ............... *H04W 8/18* (2013.01); *H04W 24/02* (2013.01); *H04W 36/0066* (2013.01); *H04W 36/22* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(56) References Cited

U.S. PATENT DOCUMENTS

| | | | |
|---|---|---|---|
| 2005/0068886 A1* | 3/2005 | Wang et al. | 370/210 |
| 2006/0183453 A1 | 8/2006 | Muhammad et al. | |
| 2008/0273582 A1* | 11/2008 | Gaal et al. | 375/224 |
| 2009/0086713 A1* | 4/2009 | Luo | 370/350 |
| 2009/0310589 A1 | 12/2009 | Nangia et al. | |
| 2009/0310653 A1* | 12/2009 | Gorday | 375/149 |
| 2011/0026649 A1* | 2/2011 | Lipka et al. | 375/343 |

FOREIGN PATENT DOCUMENTS

| | | |
|---|---|---|
| EP | 2313980 | 12/2009 |
| EP | 2398151 A1 | 12/2011 |
| GB | 2453622 A | 4/2009 |
| WO | 9820689 A1 | 5/1998 |
| WO | 0239688 A1 | 5/2002 |

* cited by examiner

DC OFFSET COMPENSATION

The invention relates to a method and apparatus for measuring a DC offset in a signal.

A key challenge for radio communication systems that must be resilient to multipath channels with large delay spreads is to perform channel equalisation in a computationally efficient manner. A common approach is to use orthogonal frequency-division multiplexing (OFDM) modulation in which the transmitted signal is composed of many narrow band signals, each using a different sub-carrier frequency. This eases the channel equalisation problem because the fading experienced by each narrow band signal is approximately flat. This means that the channels can be equalised using a simple phase/amplitude correction. The equaliser can also be efficiently and straightforwardly applied in the frequency domain. It also results in a modulation scheme that is very robust to DC offsets and narrow band interferers. This is because the DC sub-carrier is typically not used for any modulated data, while the effect of any narrow band interferers is to degrade only a limited number of sub-carriers such that forward error correction (FEC) can recover the transmitted signal in most cases.

The penalty of using OFDM is that the superposition of many narrow band signals results in a transmitted signal with a high peak to average power ratio (PAPR). In order to maintain an adequate transmit spectral mask, this requires a high back-off of the RF power amplifiers to maintain sufficient linearity, which in turn can result in poor power amplifier efficiency and so very high power dissipation. This is a significant disadvantage of OFDM for transmitters in battery powered consumer devices for which low power consumption is important.

In order to reduce PAPR and improve transmitter power amplifier efficiency while maintaining the computational benefits of the OFDM approach, a modulation scheme called Single-Carrier-Frequency-Domain-Equalisation (SC-FDE) has been adopted in some communication systems (for example, the uplink of 3GPP Long Term Evolution (LTE)). The basic principle of SC-FDE is to use a single carrier for modulation (rather than the multiple narrow band subcarriers used in OFDM) but to partition the transmitted signal into blocks where each block includes a cyclic prefix (or postfix) in an analogous manner to an OFDM system. A benefit of the cyclic prefixes (or postfixes) is that it allows frequency domain equalisation, as with OFDM.

A drawback of SC-FDE compared with OFDM is that it is less resilient to DC offsets, which can occur in most receiver implementations. In this context, a DC offset may be defined in terms of the baseband signal, after mixing-down from RF. This is because the transmitted signal does have DC energy and the amplitude and phase of this energy is dependent on the transmitted bits within a given block and so cannot in general be predicted or controlled. Any additional DC energy that is superimposed on the received DC energy from the ideal transmitted signal by the receiver has the effect of distorting the received constellation for all decoded symbols, not just a subset of symbols as is the case with OFDM. Consequently, even with FEC, the DC offsets can markedly degrade the bit error rate.

Therefore, there is a need for techniques that can estimate and cancel DC offsets such that SC-FDE modulation becomes resilient to these signal degradations.

According to one embodiment of the invention, there is provided a method for estimating an unwanted component that a receiver introduces into a signal at a known frequency, the method comprising applying a frequency offset to a signal, which comprises a wanted component at the known frequency, to form an offset signal having a frequency spectrum in which the wanted component is not positioned at the known frequency, processing the offset signal in the receiver and estimating a component positioned at the known frequency in the frequency spectrum of the processed signal.

The method may comprise determining the estimated component to be the unwanted component.

The method may comprise applying the frequency offset in the receiver.

The method may comprise comprising applying the frequency offset in a transmitter prior to transmitting the signal to the receiver.

The method may comprise including a synchronisation portion in the signal.

The method may comprise estimating the unwanted component in dependence on the synchronisation portion of the signal.

The method may comprise estimating the unwanted component by applying the frequency offset to only the synchronisation portion of the signal.

The method may comprise including a data portion in the signal, and estimating the unwanted component by applying the frequency offset to the synchronisation portion and not the data portion.

The method may comprise forming the synchronisation portion to include a plurality of repeated blocks.

The method may comprise forming the synchronisation portion such that each block comprises the same number of bits.

The method may comprise forming the synchronisation portion such that each block consists of an identical bit pattern.

The method may comprise forming the synchronisation portion to comprise at least two repeated blocks.

The method may comprise forming the synchronisation portion to have a frequency spectrum comprising a plurality of substantially equally-spaced peaks.

The method may comprise applying the frequency offset to be an odd-multiple of half of the spacing between two of the substantially equally-spaced peaks.

The method may comprise including a data portion in the signal and applying the frequency offset to the data portion.

The method may comprise removing the estimated component from the processed signal.

The method may comprise reversing the frequency offset in the signal from which the estimated component has been removed.

The method may comprise estimating the unwanted signal component in dependence on a signal energy at the known frequency in the frequency spectrum of the processed signal.

The processing of the offset signal may introduce the unwanted component, and the method may comprise estimating the unwanted component in the frequency spectrum of the processed signal.

The method may comprise applying the frequency offset to move substantially all wanted components of the signal away from the known frequency.

The method may comprise applying the frequency offset to the signal so as to generate an offset signal having substantially no signal energy at the known frequency.

The signal may comprise a synchronisation portion and a data portion, and the method may comprise applying the frequency offset to the synchronisation portion and not the data portion so as to form a combined signal in which the offset synchronisation portion has substantially no signal energy at the known frequency and the data portion comprises a wanted component at the known frequency; after processing the offset synchronisation portion, estimating the component positioned at the known frequency in the processed synchronisation portion; and after processing the data portion, subtracting the estimated component from the processed data portion.

The known frequency may be DC.

According to a second embodiment of the invention, there is provided a transceiver configured to apply a frequency offset to a signal comprising a wanted component at a known frequency to form an offset signal having a frequency spectrum in which the wanted component is not positioned at the known frequency, whereby an unwanted component introduced at the known frequency into the offset signal by a receiver can be estimated.

The transceiver may be configured to estimate the unwanted component.

The transceiver may be configured to remove the estimated unwanted component from the offset signal after it has been processed by the receiver.

The transceiver may be configured to reverse the frequency offset in the signal from which the estimated component has been removed.

The transceiver may be configured to estimate the unwanted component in dependence on a synchronisation portion of the signal.

The transceiver may be configured to apply the frequency offset to only a synchronisation portion of the signal.

The transceiver may be configured to apply the frequency offset to a data portion of the signal.

The transceiver may be configured to estimate the unwanted signal component in dependence on a signal energy at the known frequency in the frequency spectrum of the offset signal after it has been processed by the receiver.

The transceiver may be configured to form the signal to include a synchronisation portion.

The transceiver may be configured to form the synchronisation portion to include a plurality of repeated blocks.

The transceiver may be configured to form the synchronisation portion such that each block comprises the same number of bits.

The transceiver may be configured to form the synchronisation portion such that each block consists of an identical bit pattern.

The transceiver may be configured to form the synchronisation portion comprise at least two repeated blocks.

The transceiver may be configured to form the synchronisation portion to have a frequency spectrum comprising a plurality of substantially equally-spaced peaks.

The transceiver may be configured to apply the frequency offset to be an odd-multiple of half of the spacing between two of the substantially equally-spaced peaks.

The transceiver may be configured to introduce the unwanted component via the processing of the offset signal, and to estimate the unwanted component in the frequency spectrum of the processed signal.

The transceiver may be configured to apply the frequency offset so as to move substantially all wanted components of the signal away from the known frequency.

The transceiver may be configured to apply the frequency offset to the signal so as to generate an offset signal having substantially no signal energy at the known frequency.

The signal may comprise a synchronisation portion and a data portion, and the transceiver may be configured to: apply the frequency offset to the synchronisation portion and the data portion so as to form a combined signal in which the offset synchronisation portion has substantially no signal energy at the known frequency and the data portion comprises a wanted component at the known frequency; after processing the offset synchronisation portion, estimate the component positioned at the known frequency in the processed synchronisation portion; and after processing the data portion, subtract the estimated component from the processed data portion.

For a better understanding of the present invention, reference is made by way of example to the following figures, in which.

Figure 1:
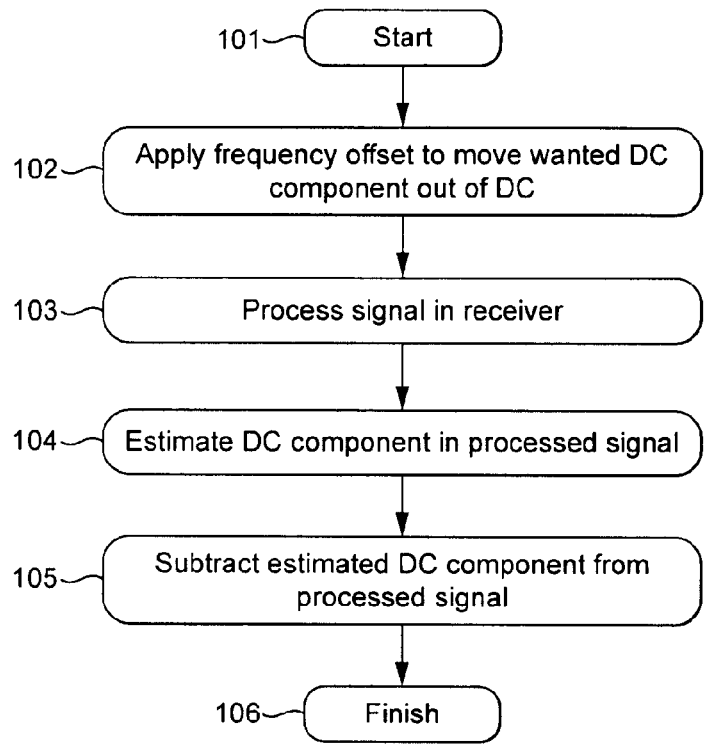
FIG. 1 shows an example of a method for determining a DC offset.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A method for estimating an unwanted DC component that is introduced into a signal by a receiver may involve applying a frequency offset to the signal. This frequency offset suitably moves a wanted DC component so that it is no longer positioned at DC in the signal's frequency spectrum. This may enable a DC component that is later introduced into the signal by a receiver to be identified and removed.

Although this method of applying a frequency offset to a signal may be most useful for estimating a DC component in a signal, it should be understood that the same method may equally be used to estimate and remove a component at any frequency of interest. Preferably, the frequency of interest is known in advance so that the receiving device knows in what part of the frequency spectrum to perform the estimation. This knowledge may come about by the receiving device having previously determined a part of the frequency spectrum in which an unwanted component was being introduced by the receiver. Alternatively, the device may be configured at the outset to estimate and remove an unwanted component at a particular frequency, e.g. by means of a particular hardware configuration or software arrangement. The frequency might also be communicated to the receiving device from another device in a communication network, e.g. a base station. Therefore, although one or more embodiments are described below with specific reference to examples in which the unwanted component is positioned at DC, it should be understood that this is for the purposes of example only and the methods, principles and apparatus described herein might equally be used to estimate signal components at other frequencies.

The frequency offset is suitably applied before the receiver performs the processing that tends to produce a DC offset in the signal. The frequency offset may be applied at the transmitter or the receiver. The "processing" that tends to produce the DC offset/unwanted component may include any of amplification, mixing, filtering etc. The "unwanted component" is a signal energy at DC (or other frequency) that is an unwanted product of the receiver's processing. The unwanted component typically forms a constituent part of the baseband version of the signal. Applying the offset suitably moves all of the wanted components of the signal away from DC before the unwanted component is introduced into the signal. Separating the wanted parts of the signal from the frequency where an unwanted component is known to be added by receiver processing may enable the unwanted component to be estimated and removed without affecting the wanted part of the signal.

The methods and apparatus describe herein may provide a robust means to estimate DC offsets in single carrier systems, such that these degradations can be removed from the incoming signal prior to decoding the information contained within the signal. A particular benefit is that the estimation methods work even when the transmitted signal contains significant wanted energy at DC.

The unwanted DC component introduced into a signal by a receiver may be estimated by including a synchronisation sequence in the signal. Suitably the synchronisation sequence is transmitted prior to the payload data. Including a synchronisation sequence as part of the signal does not necessarily introduce any extra overhead, since the method may make use of a synchronisation sequence that would have been transmitted as part of the signal anyway. Synchronisation sequences commonly form part of communications signals and may be used for purposes such as:

Detection of the presence of a wanted signal
Timing estimation
Frequency error estimation
Channel estimation (for equalisation)

This same synchronisation sequence may be used to estimate a DC offset.

For a synchronisation sequence to be used for channel estimation, as required for equalisation, it must contain energy at all of the relevant frequencies that will be used in the subsequent payload transmission. Therefore, it must contain energy at DC, so that the channel response at this frequency can be estimated. This makes it difficult to estimate and remove the unwanted DC offsets in the received signal, because conventional processing for estimating the DC offsets by simple averaging will estimate the combined energy of the unwanted DC offset plus the wanted transmitted signal, rather than just the unwanted element.

An example of a process that may address this problem is shown in FIG. 1. The process starts in step 101. In step 102, a frequency offset is applied to the signal. Suitably, the effect of this frequency offset is to move the wanted DC component away from DC. Some form of processing is then performed on the signal by the receiver (step 103). This processing may be simply converting the signal from RF to baseband. The DC component in the processed signal can then be estimated, e.g. by estimating the signal energy contained at 0 Hz (step 104). Because the wanted DC component was moved out of DC before the signal was processed, the DC component in the processed signal should be solely due to the unwanted DC offset introduced by the processing. The unwanted DC component is then removed from the processed signal by subtracting the estimated DC component (step 105).

The frequency offset may be applied to any part of the signal or the whole of the signal. If the signal comprises a synchronisation section, the offset may be applied to that synchronisation section only. The frequency offset might also be applied to the data section of the signal.

One embodiment makes use of the following elements:
A synchronisation sequence that is defined to include, at least as a subset, a repeating pattern of R identical blocks. Each block may be composed of N I/Q samples at sampling frequency Fs. A typical value of N might be 256, a typical sampling frequency might be 5 MHz, and a typical number of repeating blocks might be 16.

A systematic frequency offset applied to the synchronisation sequence. The offset may be chosen according to a mechanism described below.

Figure 2:
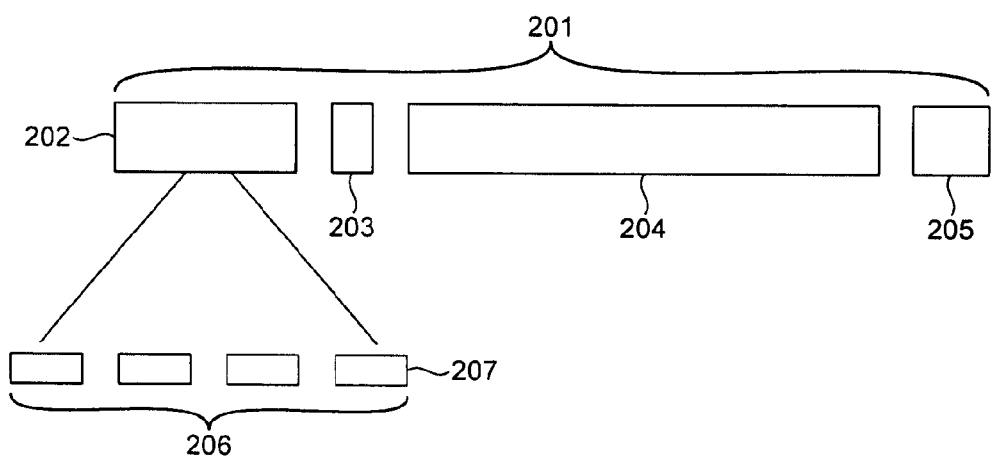
FIG. 2 shows an example of a signal.

An example of the different components that may be comprised in a signal is shown in FIG. 2. The signal, shown generally at 201, may form a frame defined according to a communication protocol or may form part of a frame, such as a communication burst. The signal comprises a synchronisation section 202, which comprises a group of blocks 206 in which each individual block 207 is identical to the others in the group. The signal also comprises a synchronisation validation word, a data section 204 comprising the payload and a CRC 205 calculated over the payload. The signal might also comprise an error correction sequence, suitably applied over the payload and the CRC, although this is not shown in FIG. 2.

Figure 3:
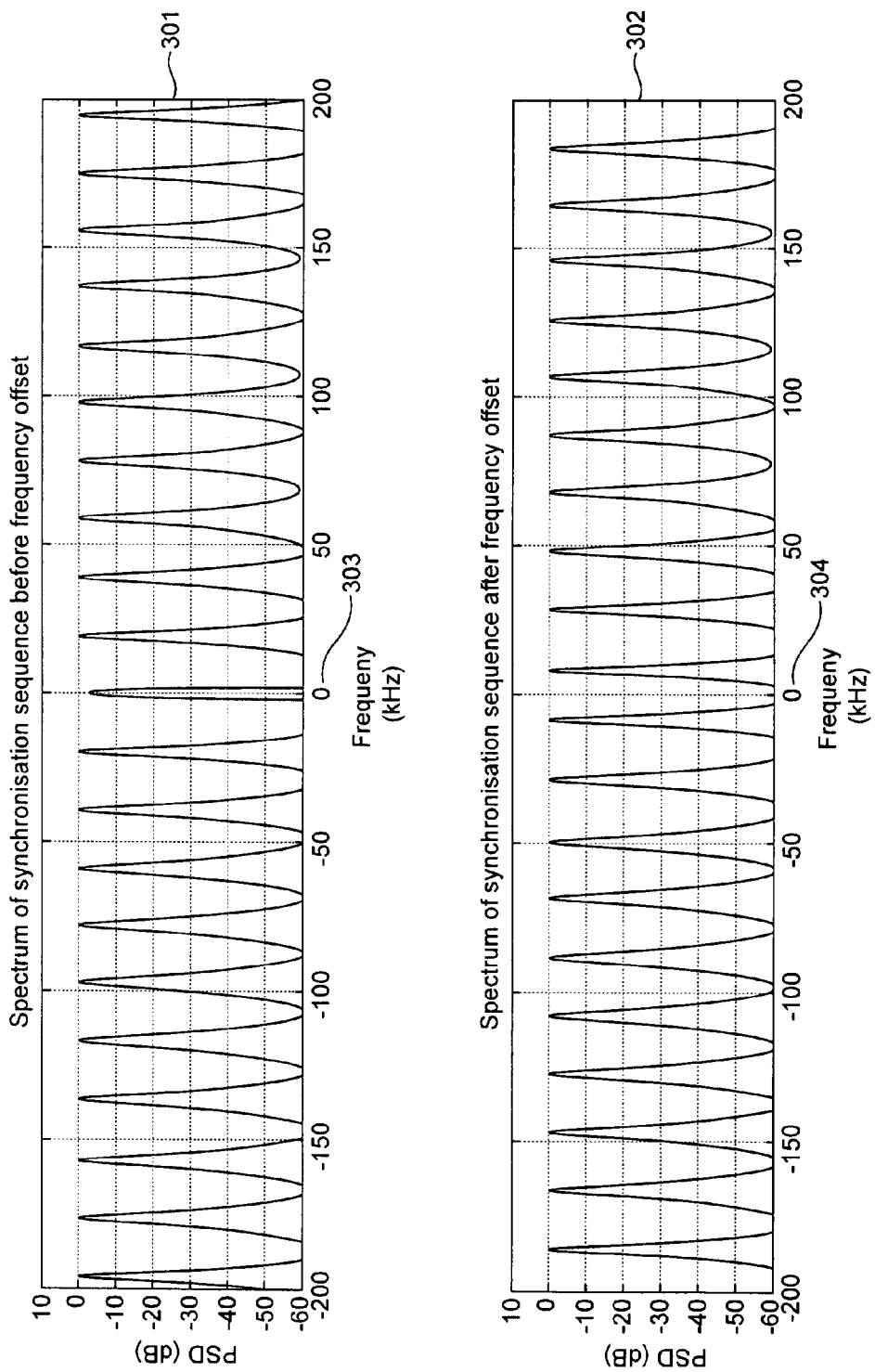
FIG. 3 shows an example of a frequency spectrum before and after adjustment.

A repeated sequence of R blocks of length N samples has a frequency spectrum that takes the form of a comb (providing that the number of repeated blocks is greater than or equal to 2). An example of such a spectrum is shown in FIG. 3. As can be seen from the figure, the frequency spectrum comprises a plurality of peaks, which are positioned a substantially equal distance apart. The frequency separation of the peaks/fingers of the comb is given by Fs/N. The bandwidth of each peak/finger of the comb is inversely dependent on the number of repeated blocks, R, over which the spectrum is measured.

By offsetting the signal in frequency such that any DC offsets fall between the fingers of the comb, it is possible to estimate the DC amplitude and phase by a conventional averaging process, since the wanted signal has little or no energy at this frequency. For optimum performance, the frequency offset is preferably half the finger separation. This means that the frequency offset is Fs/(2*N), or any odd multiple of this value. This gives maximum robustness to frequency errors by positioning the closest comb fingers equidistant in frequency from DC. However, other frequency offsets may be used.

The principle of the frequency offset is illustrated in FIG. 3. The top plot 301 shows the spectrum of the synchronisation sequence in the absence of a frequency offset. In this example, N=256, R=16 and Fs=5 MHz, and so the comb finger spacing is 5 MHz/256=19.531 kHz. The lower plot 302 shows the received signal after applying an offset of 19.531/2=9.766 kHz. As can be seen, there is almost no energy in the wanted signal at DC, hence it is straightforward to estimate any additive DC offset.

The systematic frequency offset can be introduced in different ways. For example:

The frequency offset may be applied at the transmitter. This may be achieved by means of a conventional direct conversion or zero intermediate frequency (IF) receiver architecture.

The frequency offset may be applied at the receiver. This may be achieved by means a local oscillator mixing frequency that differs from the carrier frequency by the required frequency offset. In other words, this may be achieved by using a carefully chosen intermediate frequency to mix the signal down to baseband.

In both cases, the receiver typically averages the offset signal over the R synchronisation blocks to obtain the DC offset estimate. This may involve estimating the signal energy at DC in accordance with any suitable technique. The DC offset estimate may be subtracted from the received signal, including the payload following the synchronisation sequence.

Figure 4:
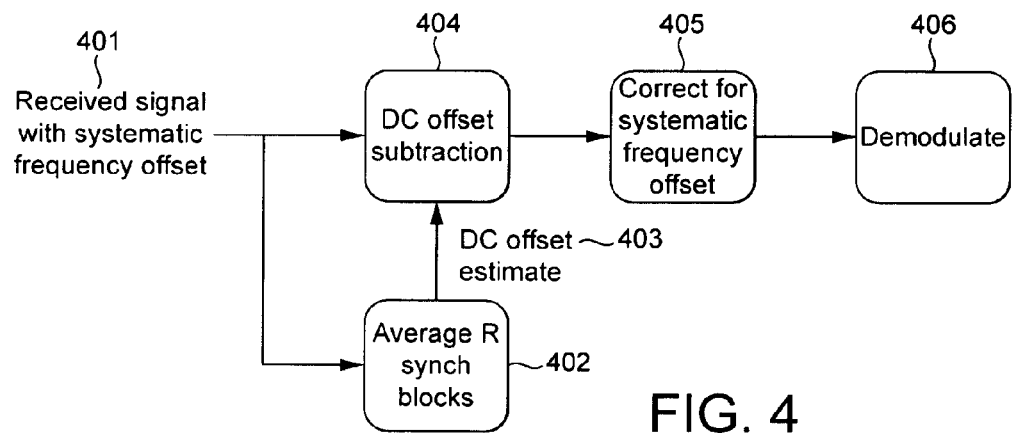
FIG. 4 shows an example of a receiver processing a signal to remove an unwanted DC offset.

It may be desirable to remove the frequency offset once the unwanted DC offset has been estimated and removed. This is particularly true when the offset has been applied to more of the signal than just the synchronisation sequence. The systematic frequency offset may be removed from the signal using a de-rotation operation. This process may be achieved by processing the signal digitally. Channel estimation and demodulation can then proceed in a conventional manner. An example of a receiver for reversing the frequency offset is shown in FIG. 4. The receiver is configured to take the offset signal (401), average the energy contained in the R synchronisation blocks to obtain an estimate of the unwanted DC offset (402) and subtract the resulting estimate (403) from the offset signal (404). The signal may then be corrected for the frequency offset (405), after which the receiver can continue with standard decoding operations such as demodulation (406).

The entire transmitted or received signal may be subjected to the frequency offset, rather than just the R synchronisation blocks. Indeed some signals may not include a synchronisation sequence at all. Applying the frequency offset to the entire signal may simplify the receiver implementation. Preferably a de-rotation operation to remove the offset is performed if the entire signal is offset.

In practice, the received signal may contain a significant frequency error due to mismatch in reference frequencies between the transmitter and the receiver. However, this does not significant degrade the DC estimation process provided that the maximum frequency error is significantly less than half the comb finger spacing (Fs/(2*N), with either polarity). This can be seen from FIG. 3, in which the comb fingers rapidly attenuate from their peak values, which means that the estimation process is robust to frequency errors provided they are smaller than about 30 to 40% of the finger spacing.

Figure 5:
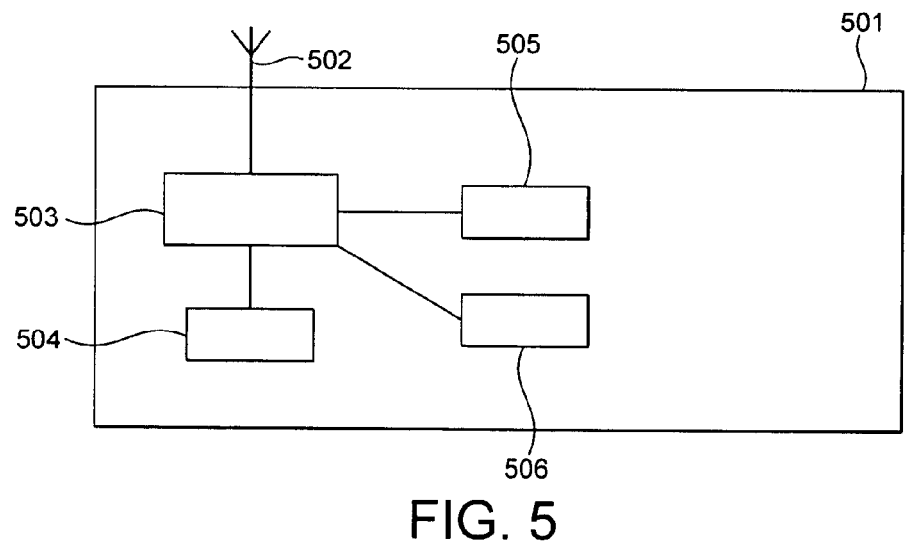
FIG. 5 shows an example of a transceiver.

An example of a transceiver in accordance with one embodiment is shown in FIG. 5. The transceiver, shown generally at 501, comprises an antenna 502 connected to a communication unit 503. The communication unit is generally configured for transmitting and receiving wireless signals. The communication unit may comprise receive and/or transmit circuitry. The transceiver also comprises an offset unit 504, which is configured to apply an appropriate frequency offset to either signals to be transmitted by the transceiver or signals that have been received by the receiver. The offset unit may also be configured to perform a de-rotation operation on signals that have had an unwanted DC component removed. The transceiver also comprises an estimation unit 505 for estimating an unwanted DC offset and removing it from the signal. The transceiver further comprises a synchronisation unit 506 for generating a synchronisation sequence for transmitting as part of a signal. The communication unit may act as a central controller by passing data between the other functional blocks.

The apparatus shown in FIG. 5 is shown illustratively as comprising a number of interconnected functional blocks. This is for illustrative purposes and is not intended to define a strict division between different parts of hardware on a chip. For example, the offset unit may form part of the receive and transmit circuitry comprised in the communication unit. In practice, the transceiver may be implemented by dedicated hardware, by a microprocessor acting under software control or by a combination of the two.

The methods and apparatus described herein may suitably be configured for operation in a network that is not specifically allocated any part of the frequency spectrum. For example, the network may be configured to operate in so-called whitespace. Since networks operating in this part of the frequency spectrum are subject to an available bandwidth that is limited and variable in both time and space, the network is preferably configured for machine-to-machine communication. Machines are generally tolerant of delays and dropped communications. A suitable communication protocol for such a communication network is Weightless.

One advantage of the methods and apparatus described above is that it enables the receiver to receive signals having wanted signal energy at the same frequency as the unwanted component. As described above, a synchronisation sequence, after being offset in frequency, may have no significant signal energy at the frequency (e.g. DC) at which the unwanted signal is introduced. This allows the unwanted component to be estimated. However, the remainder of the signal (e.g. the payload) can be received, even though that part of the signal may contain energy at the same frequency as the unwanted signal, because the previously estimated unwanted component can simply be subtracted. For the subtraction to be entirely successful at removing the unwanted component the amplitude and phase of the unwanted component should preferably not change between the synchronisation portion and the payload.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A method for estimating an unwanted component that a receiver introduces into a signal, at a known frequency, in a single carrier communication system, the method comprising:
    applying a frequency offset to a signal comprising a synchronization portion, the synchronization portion having a frequency spectrum comprising a plurality of substantially equally-spaced peaks, to form an offset signal having a frequency spectrum in which none of the substantially equally-spaced peaks is positioned at the known frequency;
    processing the offset signal in the receiver;
    estimating a component positioned at the known frequency in the frequency spectrum of the processed signal;
    removing the estimated component from the processed signal; and
    reversing the frequency offset in the signal from which the estimated component has been removed.

2. A method as claimed in claim 1, comprising forming the synchronization portion to include a plurality of repeated blocks.

3. A method as claimed in claim 1, comprising forming the synchronization portion such that each block comprises the same number of bits.

4. A method as claimed in claim 1, comprising forming the synchronization portion such that each block consists of an identical bit pattern.

5. A method as claimed in claim 1, comprising forming the synchronization portion to comprise at least two repeated blocks.

6. A method as claimed in claim 1, comprising applying the frequency offset to be an odd-multiple of half of the spacing between two of the substantially equally-spaced peaks.

7. A method as claimed in claim 1, comprising including a data portion in the signal and applying the frequency offset to the data portion.

8. A transceiver configured to apply a frequency offset to a signal in a single carrier communication system that comprises a synchronization portion, the synchronization portion having a frequency spectrum comprising a plurality of substantially equally-spaced peaks, to form an offset signal having a frequency spectrum in which none of the substantially equally-spaced peaks is positioned at the known frequency, whereby an unwanted component introduced at the known frequency into the offset signal by a receiver can be estimated;
wherein the transceiver further configured to remove the estimated unwanted component from the offset signal after it has been processed by the receiver; and
reverse the frequency offset in the signal from which the estimated component has been removed.

9. A transceiver as claimed in claim 8, configured to apply the frequency offset to a data portion of the signal.

10. A transceiver as claimed in claim 8, configured to form the synchronization portion of the signal to include a plurality of repeated blocks.

11. A transceiver as claimed in claim 10, configured to form the synchronization portion such that each block comprises the same number of bits.

12. A transceiver as claimed in claim 10, configured to form the synchronization portion such that each block consists of an identical bit pattern.

13. A transceiver as claimed in claim 10, configured to form the synchronization portion to comprise at least two repeated blocks.

14. A transceiver as claimed in claim 8, configured to apply the frequency offset to be an odd-multiple of half of the spacing between two of the substantially equally-spaced peaks.

15. A transceiver as claimed in claim 8, configured to apply the frequency offset to the signal so as to generate an offset signal having substantially no signal energy at the known frequency.

16. A transceiver as claimed in claim 8, wherein the signal comprises a synchronization portion and a data portion, the transceiver being configured to: apply the frequency offset to the synchronization portion and not the data portion so as to form a combined signal in which the offset synchronization portion has substantially no signal energy at the known frequency and the data portion comprises a wanted component at the known frequency; after processing the offset synchronization portion, estimate the component positioned at the known frequency in the processed synchronization portion; and after processing the data portion, subtract the estimated component from the processed data portion.

17. A method for estimating an unwanted component that a receiver introduces into a signal, at a known frequency, in a single carrier communication system, the method comprising:
applying a frequency offset to a signal comprising a synchronization portion, the synchronization portion having a frequency spectrum comprising a plurality of substantially equally-spaced peaks, to form an offset signal having a frequency spectrum in which none of the substantially equally-spaced peaks is positioned at the known frequency, wherein the frequency offset is applied to be an odd-multiple of half of the spacing between two of the substantially equally-spaced peaks;
processing the offset signal in the receiver; and
estimating a component positioned at the known frequency in the frequency spectrum of the processed signal.

* * * * *